United States Patent
Choi et al.

(10) Patent No.: US 9,144,342 B2
(45) Date of Patent: Sep. 29, 2015

(54) POD DISPOSAL SYSTEM

(75) Inventors: Mei Chee June Choi, Kowloon (HK); Chun Kai Chan, Kowloon (HK)

(73) Assignee: Main Power Electrical Factory, Ltd., Kwun Tong, Kowloon (HK)

( * ) Notice: Subject to any disclaimer, the term of this patent is extended or adjusted under 35 U.S.C. 154(b) by 210 days.

(21) Appl. No.: 13/404,720

(22) Filed: Feb. 24, 2012

(65) Prior Publication Data

US 2013/0223965 A1   Aug. 29, 2013

(51) Int. Cl.
*A47J 31/44*   (2006.01)
*A47J 31/36*   (2006.01)

(52) U.S. Cl.
CPC ................................ *A47J 31/3638* (2013.01)

(58) Field of Classification Search
CPC ............ B65D 85/8043; A47J 31/0663; A47J 31/3614
USPC ..................... 99/289 R, 295, 302 R
See application file for complete search history.

(56) References Cited

U.S. PATENT DOCUMENTS

| | | | | |
|---|---|---|---|---|
| 5,454,293 A | * | 10/1995 | Santi | 99/289 R |
| 5,649,472 A | * | 7/1997 | Fond et al. | 99/295 |
| 5,762,987 A | * | 6/1998 | Fond et al. | 426/433 |
| 6,490,966 B2 | * | 12/2002 | Mariller et al. | 99/289 R |
| 7,028,604 B2 | * | 4/2006 | Cortese | 99/295 |
| 7,165,488 B2 | * | 1/2007 | Bragg et al. | 99/295 |
| 7,513,192 B2 | * | 4/2009 | Sullivan et al. | 99/289 R |
| 7,827,905 B2 | * | 11/2010 | Bardazzi | 99/289 R |
| 7,946,217 B2 | * | 5/2011 | Favre et al. | 99/295 |
| 8,291,812 B2 | * | 10/2012 | Rivera | 99/286 |
| 2002/0124736 A1 | * | 9/2002 | Kollep et al. | 99/289 R |
| 2010/0037779 A1 | * | 2/2010 | Pecci et al. | 99/289 R |
| 2010/0064899 A1 | * | 3/2010 | Aardenburg | 99/295 |
| 2011/0017071 A1 | * | 1/2011 | Stefanoni | 99/288 |
| 2011/0017072 A1 | * | 1/2011 | Frigeri et al. | 99/289 P |
| 2012/0000371 A1 | * | 1/2012 | Blanchino et al. | 99/295 |
| 2012/0090473 A1 | * | 4/2012 | Deuber | 99/289 R |
| 2012/0207894 A1 | * | 8/2012 | Webster et al. | 426/433 |

* cited by examiner

*Primary Examiner* — Dana Ross
*Assistant Examiner* — Jimmy Chou
(74) *Attorney, Agent, or Firm* — Wells St. John P.S.

(57) ABSTRACT

A pod disposal system has a pod holder for holding a coffee pod; a moveable chamber including an engaging member for engaging with the coffee pod, and an ejector operably connected to the engager for disengaging the coffee pod from the engager, An actuator moves the moveable chamber between an engaging position, in which the engager engages with the coffee pod, an intermediate position, in which the moveable chamber moves the coffee pod out of the pod holder, and a disengaging position, in which the ejector disengages the coffee pod from the engager, thereby disposing the coffee pod.

21 Claims, 5 Drawing Sheets

POD DISPOSAL SYSTEM

TECHNICAL FIELD

The present invention relates to a pod disposal system for a coffee machine.

BACKGROUND

Coffee machines for use with coffee pods have been available for a long time. A conventional coffee machine includes a holder with numerous outlets which are capable of piercing through one side of the coffee pod. Above the coffee pod holder is a brewing chamber which can be moved upwards and downwards by using by using a handle. The brewing chamber includes one or more steam nozzles, which, when the brewing chamber is put in contact with the pod holder, penetrates the top side of the coffee pod and eject steam through the coffee pod into the outlets. The outlets are connected to a major outlet in the form of a tube, such that steam passing through the coffee pod maybe collected as coffee at the major outlet. At the end of round of brewing, the user removes the coffee pod from the steam nozzle, such that the coffee machine is ready for another round of brewing. A major drawback of the conventional coffee machine is that a user has to manually remove the coffee pod from the steam nozzle, which is non-hygienic and inconvenient.

It is therefore an object of the present invention to provide a pod disposal system for a coffee machine where the aforementioned shortcoming is mitigated, or to at least provide a useful alternative to the trade and public.

SUMMARY OF THE INVENTION

According to the invention there is provided a pod disposal system including a pod holder for holding a coffee pod; a moveable chamber including an engaging member for engaging with the coffee pod, and an ejector operably connected to the engager for disengaging the coffee pod from the engager; and an actuator for moving the moveable chamber between an engaging position, in which the engager engages with the coffee pod, an intermediate position, in which the moveable chamber moves the coffee pod out of the pod holder, and a disengaging position, in which the ejector disengages the coffee pod from the engager, thereby disposing the coffee pod.

Preferably, the engaging member includes an engager. Preferably, the engager is a steam nozzle. Preferably, the ejector is an ejector ring or an ejector plate with openings to allow the engager to pass through, and/or is moveable relative to the engaging member, and/or the ejector is in contact with the engaging member in the engaging and intermediate position, and/or is separated from the engaging member in the disengaged position, and/or ejector is operably connected to the engaging member by a connector.

Preferably, the connector is a side panel, and/or includes a guiding track for guiding movement of the engager towards and away from the engaging member. Preferably, the ejector includes a first guiding member.

Preferably, guiding member of the ejector engages with the guiding track of the connector, wherein movement of the guiding member in a first direction effects movement of the ejector towards the engaging member, and movement of the guiding member in a second direction effects movement of the ejector away from the engaging member.

Preferably, the moveable chamber includes a means for locking the ejector in a position in which it is in contact with the engaging member.

Preferably, the locking means is a channel which intersects the guiding track at an angle, wherein movement of the guiding member from the guiding track to the channel locks the ejector in a position in which it is in contact with the engaging member.

Preferably, pod disposal system includes a side wall. Preferably, the side wall includes a first guiding track. Preferably, the first guiding track is substantially parallel to the height of the side wall.

Preferably, the moveable chamber includes a second guiding member. Preferably, the second guiding member engages with the first guiding track, wherein movement of the second guiding member along the first guiding track effects movement of the moveable chamber along the height of the side wall.

Preferably, the side wall includes a second guiding track. Preferably, the second guiding track is inclined at an angle relative to the first guiding track. Preferably, first guiding member engages with the second guiding track, wherein movement of the guiding member of the ejector along the second guiding track effects pivotal movement of the moveable chamber relative to the actuator. Preferably, the second guiding track further includes a parallel portion, wherein the parallel portion is parallel to the height of the side wall. Preferably, wherein the parallel portion of the second guiding track is substantially aligned with the first guiding track along the height of the side wall. Preferably, wherein the actuator effects movements of the first and the second guiding members simultaneously. Preferably, movement of the first guiding member along the second guiding track towards the parallel portion effects movement of the ejector towards the engaging member, and wherein movement of the first guiding member along the parallel portion of the second guiding track towards the base of the side wall locks the moveable member in a configuration in which the ejector is in contact with the engaging member.

For a better understanding of the invention and to show how the same may be performed, a preferred embodiment thereof will not be described, by way of non-limiting example only, with reference to the accompanying drawing.

DESCRIPTION OF PREFERRED EMBODIMENT

Figure 1:
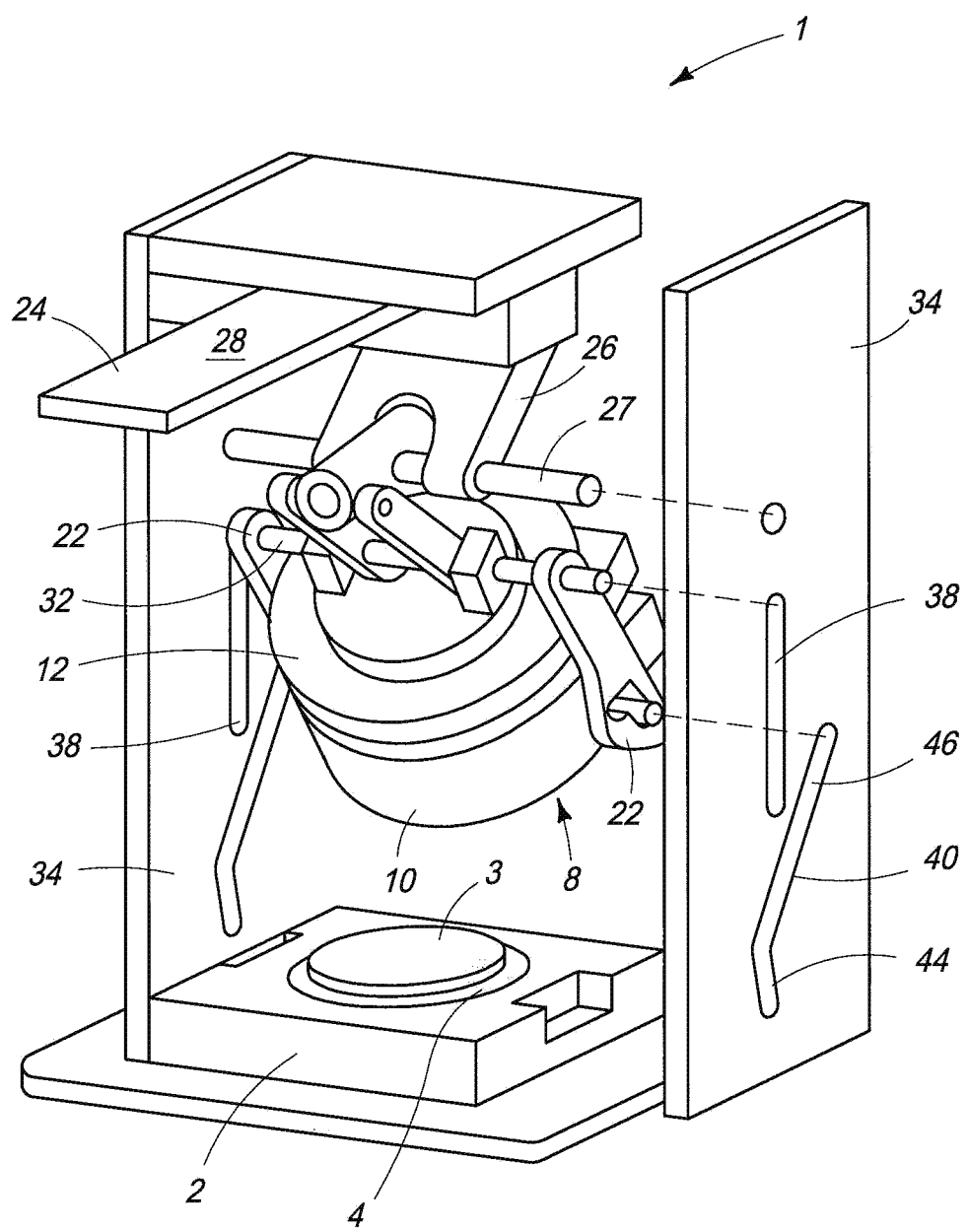
FIG. 1 is a rear perspective view of the pod disposal system in a disengaging position according to an embodiment of the present invention.

According a present invention, there is provided a pod disposal system for a coffee machine. The pod disposal system includes a pod holder 2 with a recess 4, onto which a coffee pod 3 maybe placed (see FIG. 1). The recess contains numerous outlets 6, capable of piecing through the side of a coffee pod facing the recess 4.

A brewing chamber 8 is provided above the coffee pod holder 2, and is moveable towards and away from the coffee pod holder 2. The brewing chamber 8 includes a brewing cylinder 10, an engaging member 12, and an ejector 14. In a preferred embodiment, the engaging member contains a plate 12 with a number of steam nozzles 16. The plate 12 is positioned directly above the brewing cylinder 10, which surrounds the steam nozzles 16. In a preferred embodiment, the steam nozzle 16 is in the form of a pin, which is capable of penetrating the top side 18 of the coffee pod, thereby engaging it. An ejector 14 is provided within the brewing cylinder 10 and is positioned beneath the steam nozzles 16 for disengaging the coffee pod 3 from the steam nozzles 16. In an embodiment of the present invention, the ejector 14 is a in the form of an ejector ring 14. The ejector ring 14 is connected to the engaging member 12 by two side panels 22, and is moveable relative to the engaging member along a central axis p (see FIG. 3).

In an embodiment of the invention, the brewing chamber 8 is connected to a handle 24. In a preferred embodiment, the handle 24 contains an actuating portion 28, and an attachment portion 26, which is connected to the brewing chamber 8. The actuating portion 28 of the handle 24 is pivotally moveable (via a pivot 27) relative to the attachment portion 26, such that when a user presses the free end of the actuating portion 28 downwards, the brewing chamber is lifted up by the attachment portion 26, and when a user pulls the free end of the actuating portion 28 upwards, the attachment portion 26 pushes the brewing chamber 8 downwards onto the coffee pod holder 2.

In an embodiment, the brewing chamber 8 is connected to the attachment portion 26 of the handle 24 via a pair of connectors 30. The connectors 30 are attached to the plate 12 of the engaging member via an axle 32, which penetrates the side panels 22, thereby engaging the side panels 22.

According to an embodiment of the present invention, the pod disposal system 1 further includes two side walls 34, which are fixed on two opposing sides of the coffee pod holder 2 by screws 36. Each side wall 34 has a first guiding track 38 that is centrally positioned on each side wall 34 and is parallel to the height of the side wall 34. The axle 32 is slidably engaged to the first guiding track 38, such that when a user actuates the actuating portion 28 of the handle 24, the actuation causes the axle 32 to slide along the first guiding track 38, thereby moving the brewing chamber 8 upwards and downwards along the height of the side wall 34.

Figure 3:
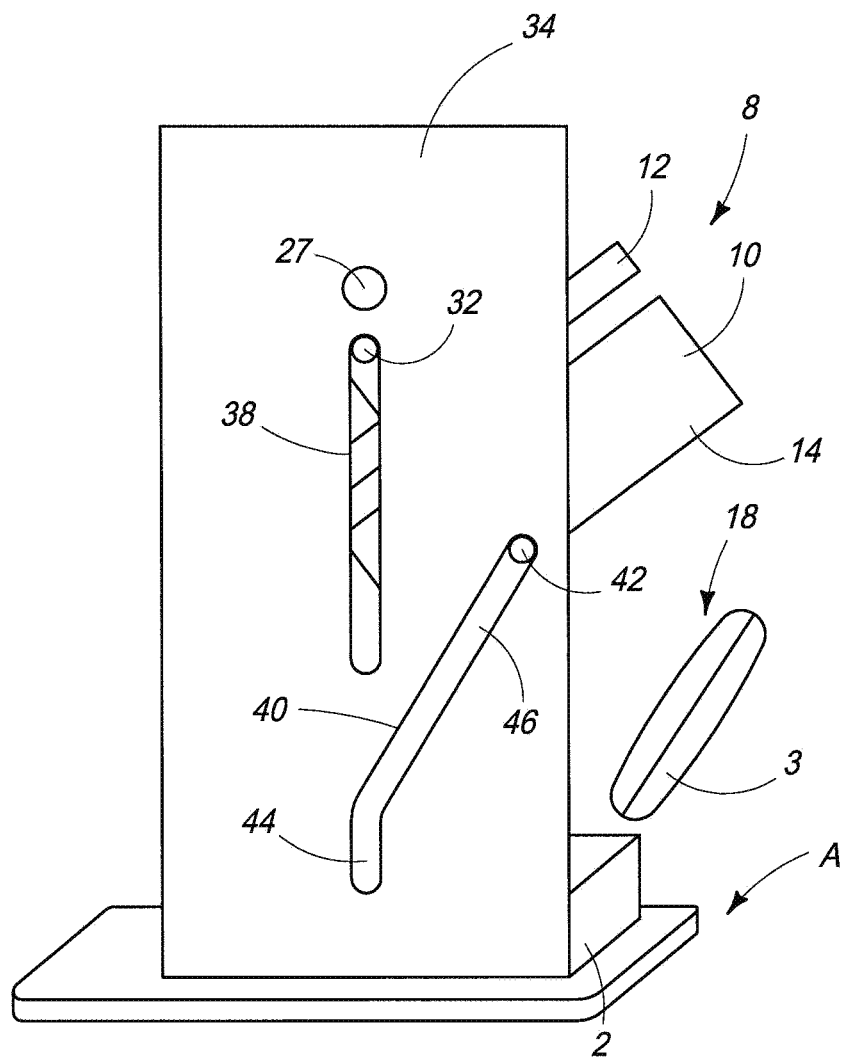
FIG. 3 is a rear perspective view of the pod disposal system in a disengaging position.
Figure 4:
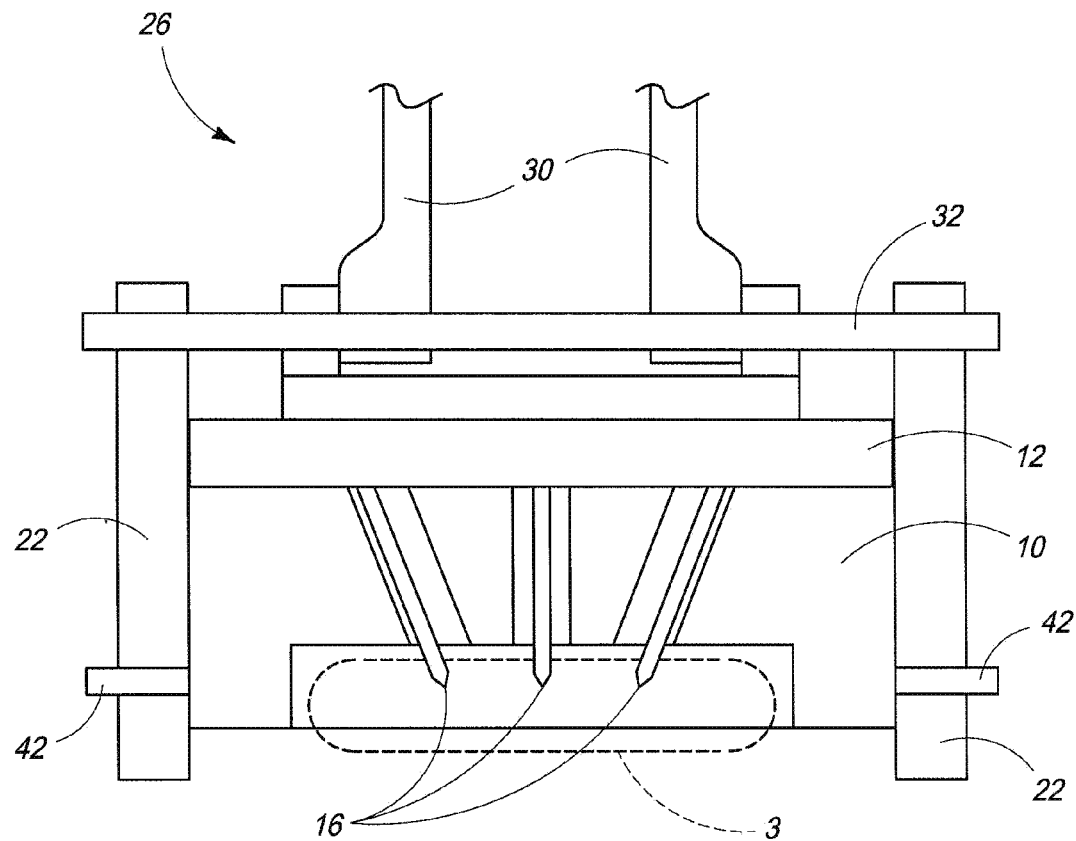
FIG. 4 is a zoomed-in view of the brewing chamber without the brewing cylinder, in the engaging position.
Figure 4A:
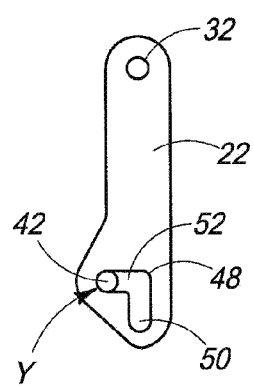
FIG. 4A is a side illustrative view of the brewing chamber side arm, in the engaging position.

Referring now to FIGS. 3 and 4, according to an embodiment of the invention, each side panel 22 includes a guiding track 40, which adopts an inverted "L" shape, having a vertical portion 44, and a horizontal portion 46. The ejector 14 includes a side arm 42 on two opposite sides. Each side arm 42 is slidably engaged with the guiding tack 40 on each side panels 22, such that sliding movements of the side arm 42 along the vertical portion 44 of the guiding track 40 effect movement of the ejector 14 towards and away from the engaging member 12.

Accordingly, when the side arm 42 is in position X along the vertical portion 44 of the guiding track 40, that is proximal to the coffee pod holder 2 relative to the intersecting point between the vertical 44 and the horizontal portion 46, the ejector 14 is separated from the engaging member 12; and when the side arm 42 slides from position X to the intersecting point, the ejector 14 is in contact with the engaging member 12. When the side arm 42 slides from the intersecting point to the end of the horizontal portion 46 of the guiding track 40, the ejector 14 is locked in a position in which it is in contact with the engaging member 12 (i.e. the engaged configuration). In an embodiment of the present invention, the ejector 14 is a ring. In an alternative embodiment, the ejector 14 can be in the form of a plate with openings to allow penetration of the steam nozzles 16, or it could be in any other suitable form. In the engaged configuration, the side arm 42 of the ejector 14 is either at the intersecting point or position Y of the guiding track 40, the steam nozzles 16 protrudes from the ejector, allowing them to engage with the coffee pod 3, and the ejector is sandwiched between the coffee pod 3 and the engaging member 12. It can therefore be understood that, after the engagement, as the side arms 42 slide into position X of the guiding track 40, the ejector 14 separates from the engaging member 12, thereby, pushing the coffee pod 3 out of the steam nozzles 16.

Figure 2:
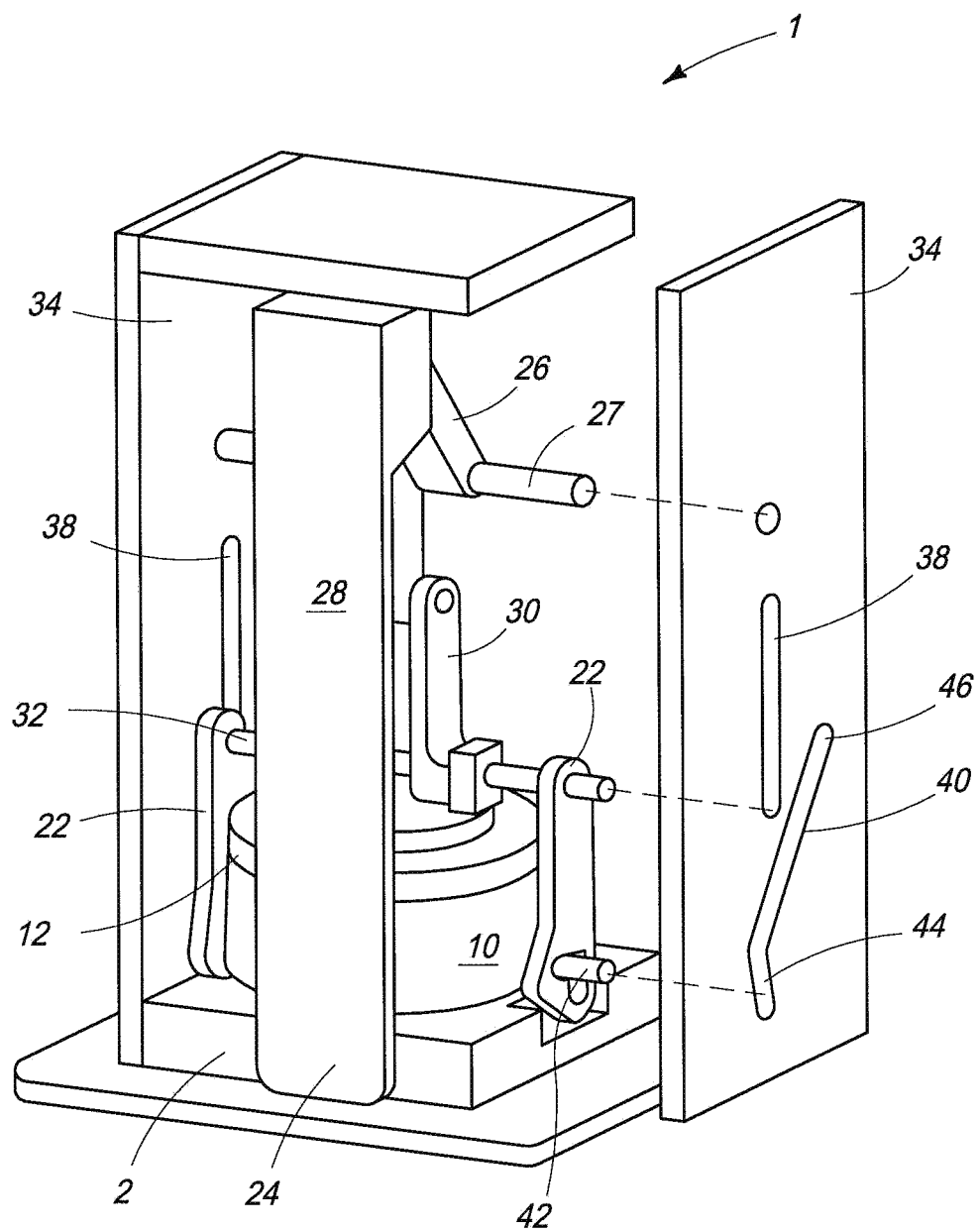
FIG. 2 is a rear perspective view of the pod disposal system of FIG. 1 in an engaging position.

Turning back to FIGS. 1 and 2, according to an embodiment of the present invention, each side wall 34 of the pod disposal system 1 includes a second guiding track 48, having a vertical portion 50 and an inclined portion 52. As can be seen from FIGS. 1 and 2, the vertical portion 50 of the second guiding track 48 is substantially parallel to the height of the side wall 34, and is aligned with the first guiding track 38 along the height of the side wall 34.

According to an embodiment of the invention, the side arm 42 of the ejector 14 penetrates through the guiding track 40 of the side panel 22, and slidably engages with the second guiding track 48. In an engaging position, the user presses the actuating portion 26 of the handle 24 downwards to move brewing chamber 8 downwards, such that it presses against the coffee pod holder 2. In the engaging position, the axle 32 is at the bottom end of the first guiding track 38, and the side arm 42 is at the bottom end (i.e. position A) of the vertical portion 44 of the second guiding track 48 and at position Y of the guiding track 40, the ejector 14 is in contact with the engaging member 12, the steam nozzles 16 protrudes from the ejector 14 and penetrates the coffee pod 1 thereby engaging it. In a preferred embodiment, the engaging position is also the brewing position.

As the user pulls the actuating portion 26 of the handle 24 upwards, the brewing chamber 8 moves to an intermediate position, in which the axle 32 is slight above the bottom end of the first guiding track 38, and the side arm 42 is at the intersecting point between the vertical portion 44 and the inclined portion 46 of the second guiding track 48. In this position, the brewing chamber 8 is moved upwards slightly but the side arm 42 remains in position Y of the guiding track 40, such that the ejector 14 remains in the engaged configuration. It is therefore conceivable that in the intermediate position, the steam nozzles 16 remains engaged to the coffee pod 1, thereby removing it from the coffee pod holder 2 as the brewing chamber 8 moves upwards.

Figure 5:
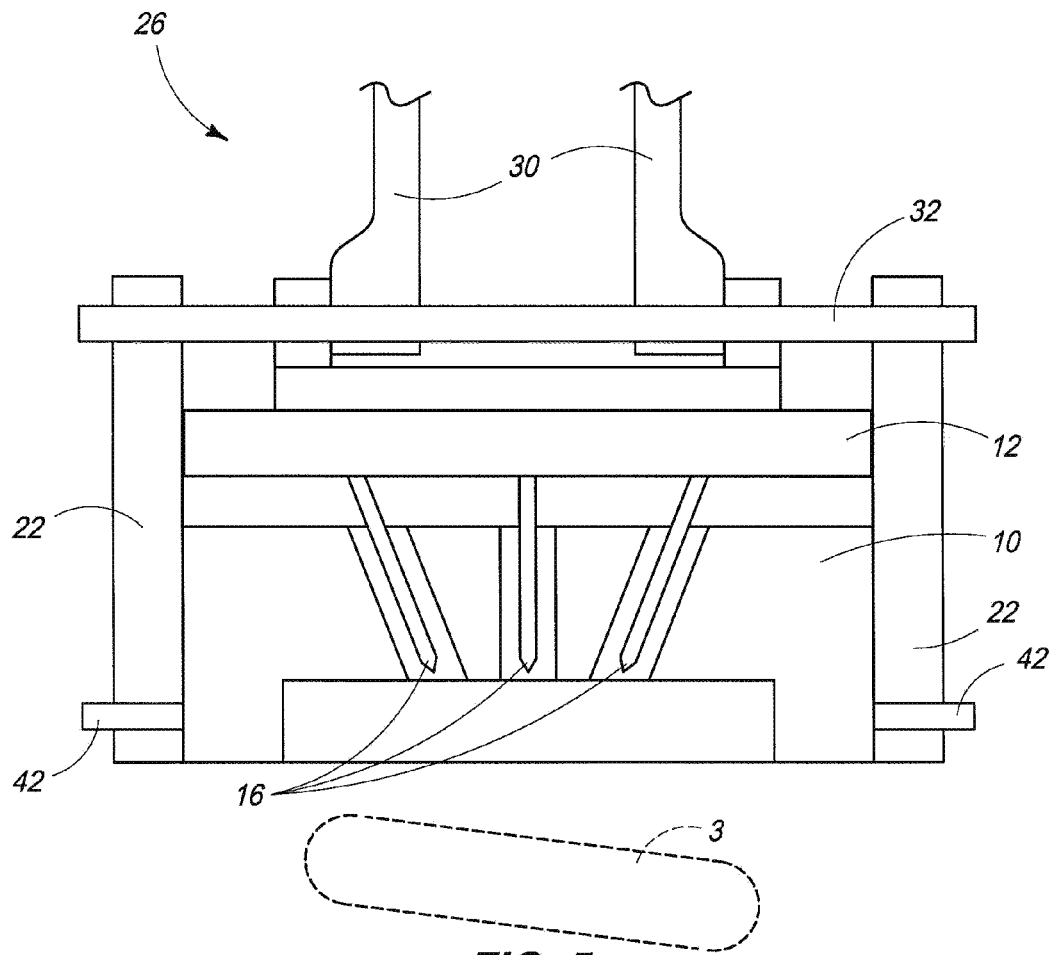
FIG. 5 is a zoomed-in view of the brewing chamber without the brewing cylinder in the disengaging position.
Figure 5A:
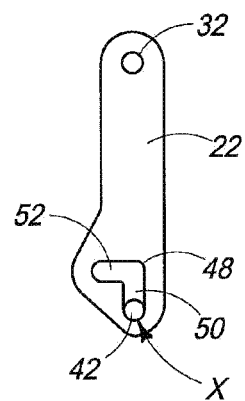
FIG. 5A is a side illustrative view of the brewing chamber side arm in the disengaging position.

As the user pulls the handle of the actuating portion 28 of the handle 24 further, the axle 32 moves further upwards along the first guiding track 38, and the side arm 42 enters the inclined portion 52 of the second guiding track 48. As the side arm 42 enters the inclined portion 52 of the second guiding track 48, the brewing chamber 8 is tilted at an angle (see FIG. 1). As the axle 32 reaches the top end of the first guiding track 38, and the side arm 42 reaches position B of the second guiding track 48 (i.e. the disengaging position), the side arm 42 slides from position Y to position X of the guiding track 40 on the side panel. The sliding movement of the side arm 42 from position Y to position X separates the ejector 14 from the engaging member 12, thereby disengaging the coffee pod 1 from the steam nozzles 16. As the brewing chamber 18 is tilted at an angle, it is conceivable that the coffee pod will fall into an area adjacent to the coffee pod holder 2 (as shown in FIG. 5). In a preferred embodiment, a bin may be provided adjacent to the coffee pod holder 2 to receive the used coffee pods. It can be seen that, after disposing the used coffee pod by the pod disposal system 1, the coffee machine is ready for the next round of brewing. The advantage of this invention is that the user will not have to manually remove the used coffee pod from the machine between each round of brewing.

The invention described herein is susceptible to variations, modifications and/or additions other than those specifically described and it is to be understood that the invention includes all such variations, modifications and/or additions which fall within the scope of the following claims.

The invention claimed is:

1. A pod disposal system including:
 a pod holder for holding a coffee pod;
 a moveable chamber including an engaging member for engaging with the coffee pod, and an ejector moveable relative to the engaging member for disengaging the coffee pod from the engaging member;
 a connector having a guiding track for guiding movement of the ejector towards and away from the engaging member,
 an actuator for moving the moveable chamber between an engaging position, in which the engaging member engages with the coffee pod, an intermediate position, in which the moveable chamber moves the coffee pod out of the pod holder, and a disengaging position, in which the ejector disengages the coffee pod from the engaging member, thereby disposing the coffee pod,
 wherein the ejector includes a first guiding member that engages with the guiding track of the connector, such that movement of the first guiding member in a first direction effects movement of the ejector towards the engaging member, and movement of the first guiding member in a second direction effects movement of the ejector away from the engaging member; and
 a side wall and wherein the moveable chamber includes a second guiding member and the side wall includes a first guiding track, wherein the second guiding member engages with the first guiding track, and wherein movement of the second guiding member along the first guiding track effects movement of the moveable chamber along a height of the side wall.

2. A pod disposal system according to claim 1 wherein the engaging member includes a steam nozzle.

3. A pod disposal system according to claim 1 wherein the ejector is an ejector ring.

4. A pod disposal system according to claim 1 wherein the ejector is an ejector plate with openings to allow the engaging member to pass through.

5. A pod disposal system according to claim 1 wherein the ejector is moveable relative to the engaging member.

6. A pod disposal system according to claim 1 wherein the ejector is in contact with the engaging member in the engaging and intermediate position.

7. A pod disposal system according to claim 1 wherein the ejector is separated from the engaging member in the disengaged position.

8. A pod disposal system according to claim 1, wherein the moveable chamber includes a lock for locking the ejector in a position in which the ejector is in contact with the engaging member.

9. A pod disposal system according to claim 8, wherein the lock is a channel which intersects the guiding track of the connector at an angle, wherein movement of the first guiding member from the guiding track of the connector to the channel locks the ejector in a position in which it is in contact with the engaging member.

10. A pod disposal system according to claim 1, wherein the first guiding track is substantially parallel to the height of the side wall.

11. A pod disposal system according to claim 1, wherein the side wall includes a second guiding track.

12. A pod disposal system according to claim 11, wherein the second guiding track is inclined at an angle relative to the first guiding track.

13. A pod disposal system according to claim 11, wherein the first guiding member engages with the second guiding track, wherein movement of the first guiding member of the ejector along the second guiding track effects pivotal movement of the moveable chamber relative to the actuator.

14. A pod disposal system according to claim 12, wherein the second guiding track further includes a parallel portion, wherein the parallel portion is parallel to the height of the side wall.

15. A pod disposal system according to claim 14, wherein the parallel portion of the second guiding track is substantially aligned with the first guiding track along the height of the side wall.

16. A pod disposal system according to claim 1 wherein the actuator effects movements of the first and the second guiding members simultaneously.

17. A pod disposal system according to claim 14, wherein movement of the first guiding member along the second guiding track towards the parallel portion effects movement of the ejector towards the engaging member, and wherein movement of the first guiding member along the parallel portion of the second guiding track towards a base of the side wall locks the ejector in a configuration in which the ejector is in contact with the engaging member.

18. A pod disposal system including:
 a pod holder for holding a coffee pod;
 a moveable chamber including an engaging member for engaging with the coffee pod, and an ejector moveable relative to the engaging member for disengaging the coffee pod from the engaging member;
 an actuator for moving the moveable chamber between an engaging position, in which the engaging member engages with the coffee pod, an intermediate position, in which the moveable chamber moves the coffee pod out of the pod holder, and a disengaging position, in which the ejector disengages the coffee pod from the engaging member, thereby disposing the coffee pod;
 a side wall which includes a first guiding track and a second guiding track;
 wherein the second guiding track is inclined at an angle relative to the first guiding track;
 wherein the second guiding track further includes a parallel portion, wherein the parallel portion is parallel to the height of the side wall; and
 wherein the ejector includes a first guiding member and wherein movement of the first guiding member along the second guiding track towards the parallel portion effects movement of the ejector towards the engaging member, and wherein movement of the first guiding member along the parallel portion of the second guiding track towards a base of the side wall locks the ejector in a configuration in which the ejector is in contact with the engaging member.

19. A pod disposal system including:
 a pod holder for holding a coffee pod;

a moveable chamber including an engaging member for engaging with the coffee pod, and an ejector moveable relative to the engaging member for disengaging the coffee pod from the engaging member;
a connector having a guiding track for guiding movement of the ejector towards and away from the engaging member, and
an actuator for moving the moveable chamber between an engaging position, in which the engaging member engages with the coffee pod, an intermediate position, in which the moveable chamber moves the coffee pod out of the pod holder, and a disengaging position, in which the ejector disengages the coffee pod from the engaging member, thereby disposing the coffee pod,
wherein the ejector includes a guiding member that engages with the guiding track of the connector, such that movement of the guiding member in a first direction effects movement of the ejector towards the engaging member, and movement of the guiding member in a second direction effects movement of the ejector away from the engaging member;
wherein the moveable chamber includes a lock for locking the ejector in a position in which the ejector is in contact with the engaging member; and
wherein the lock is a channel which intersects the guiding track at an angle, wherein movement of the guiding member from the guiding track to the channel locks the ejector in a position in which it is in contact with the engaging member.

20. A pod disposal system including:
a pod holder for holding a coffee pod;
a moveable chamber including an engaging member for engaging with the coffee pod, and an ejector moveable relative to the engaging member for disengaging the coffee pod from the engaging member;
a connector having a guiding track for guiding movement of the ejector towards and away from the engaging member, and
an actuator for moving the moveable chamber between an engaging position, in which the engaging member engages with the coffee pod, an intermediate position, in which the moveable chamber moves the coffee pod out of the pod holder, and a disengaging position, in which the ejector disengages the coffee pod from the engaging member, thereby disposing the coffee pod,
wherein the ejector includes a guiding member that engages with the guiding track of the connector, such that movement of the guiding member in a first direction effects movement of the ejector towards the engaging member, and movement of the guiding member in a second direction effects movement of the ejector away from the engaging member;
a side wall which includes a first guiding track and a second guiding track;
wherein the second guiding track is inclined at an angle relative to the first guiding track;
wherein the second guiding track further includes a parallel portion, wherein the parallel portion is parallel to the height of the side wall; and
wherein the parallel portion of the second guiding track is substantially aligned with the first guiding track along the height of the side wall.

21. A pod disposal system including:
a pod holder for holding a coffee pod;
a moveable chamber including an engaging member for engaging with the coffee pod, and an ejector moveable relative to the engaging member for disengaging the coffee pod from the engaging member;
a connector having a guiding track for guiding movement of the ejector towards and away from the engaging member, and
an actuator for moving the moveable chamber between an engaging position, in which the engaging member engages with the coffee pod, an intermediate position, in which the moveable chamber moves the coffee pod out of the pod holder, and a disengaging position, in which the ejector disengages the coffee pod from the engaging member, thereby disposing the coffee pod,
wherein the ejector includes a guiding member that engages with the guiding track of the connector, such that movement of the guiding member in a first direction effects movement of the ejector towards the engaging member, and movement of the guiding member in a second direction effects movement of the ejector away from the engaging member;
a side wall which includes a first guiding track and a second guiding track;
wherein the second guiding track is inclined at an angle relative to the first guiding track;
wherein the second guiding track further includes a parallel portion, wherein the parallel portion is parallel to the height of the side wall; and
wherein the ejector includes a first guiding member and wherein movement of the first guiding member along the second guiding track towards the parallel portion effects movement of the ejector towards the engaging member, and wherein movement of the first guiding member along the parallel portion of the second guiding track towards a base of the side wall locks the ejector in a configuration in which the ejector is in contact with the engaging member.

\* \* \* \* \*